(12) United States Patent
Osawa et al.

(10) Patent No.: US 9,158,010 B2
(45) Date of Patent: Oct. 13, 2015

(54) RADIATION DETECTOR

(75) Inventors: Hirotake Osawa, Hamamatsu (JP);
Yutaka Kusuyama, Hamamatsu (JP);
Shintaro Toyama, Hamamatsu (JP);
Masanori Yamashita, Hamamatsu (JP);
Munenori Shikida, Hamamatsu (JP)

(73) Assignee: HAMAMATSU PHOTONICS K.K.,
Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/810,236

(22) PCT Filed: Jun. 17, 2011

(86) PCT No.: PCT/JP2011/063968
§ 371 (c)(1),
(2), (4) Date: Jan. 15, 2013

(87) PCT Pub. No.: WO2012/026187
PCT Pub. Date: Mar. 1, 2012

(65) Prior Publication Data
US 2013/0112884 A1 May 9, 2013

(30) Foreign Application Priority Data

Aug. 24, 2010 (JP) ................. 2010-187447

(51) Int. Cl.
*G01T 1/20* (2006.01)
*G01T 1/202* (2006.01)
(52) U.S. Cl.
CPC ...................................... *G01T 1/202* (2013.01)
(58) Field of Classification Search
CPC ....................................................... G01T 1/202

USPC .......................................................... 250/367
See application file for complete search history.

(56) References Cited

U.S. PATENT DOCUMENTS

| 6,800,362 | B2 | 10/2004 | Van Den Bergh et al. |
| 7,091,501 | B2 | 8/2006 | Joly et al. |
| 7,375,341 | B1 | 5/2008 | Nagarkar et al. |
| 2001/0023924 | A1* | 9/2001 | Takabayashi et al. .... 250/361 R |
| 2008/0099694 | A1* | 5/2008 | Shoji et al. ................ 250/483.1 |
| 2013/0048864 | A1* | 2/2013 | Nakatsugawa ............. 250/366 |

FOREIGN PATENT DOCUMENTS

| CN | 1305594 | 7/2001 |
| CN | 1501095 | 6/2004 |
| CN | 1626310 | 6/2005 |
| CN | 1868671 | 11/2006 |

(Continued)

*Primary Examiner* — David Porta
*Assistant Examiner* — Edwin Gunberg
(74) *Attorney, Agent, or Firm* — Drinker Biddle & Reath LLP

(57) ABSTRACT

Provided is a radiation detector 1 capable of improving reliability while using a plurality of light receiving elements to provide a large screen size. A radiation detector 1 includes: a flexible supporting substrate 5 that includes a radiation incident surface 5a and a radiation emission surface 5b; a scintillator layer 6 made from a plurality of columnar crystals H formed on the emission surface 5b through crystal growth and generating light due to the incident radiation; a moisture-proof protective layer 7 covering the scintillator layer 6 and filled between the plurality of columnar crystals H; and light receiving elements 8A to 8D arranged to oppose the scintillator layer 6 and detecting the light generated in the scintillator layer 6.

7 Claims, 10 Drawing Sheets

(56) References Cited

FOREIGN PATENT DOCUMENTS

| | | |
|---|---|---|
| CN | 101024275 | 8/2007 |
| JP | 9-257943 | 10/1997 |
| JP | 9-260626 | 10/1997 |
| JP | H11-223891 | 8/1999 |
| JP | 2000-9845 | 1/2000 |
| JP | 2000-9847 | 1/2000 |
| JP | 2000-131444 | 5/2000 |
| JP | 2000-284053 | 10/2000 |
| JP | 2001-74846 | 3/2001 |
| JP | 2004-61115 | 2/2004 |
| JP | 2006-133152 | 5/2006 |
| JP | 2007-285709 | 11/2007 |
| JP | 2008-286785 | 11/2008 |
| JP | 2010-101722 | 5/2010 |
| WO | WO 00/036436 | 6/2000 |
| WO | 2008/018277 | 2/2008 |
| WO | 2010/010726 | 1/2010 |

\* cited by examiner

RADIATION DETECTOR

TECHNICAL FIELD

The present invention relates to a radiation detector used for detecting a radiation.

BACKGROUND ART

In the related art, a radiation detector in which a polymer film is used as a supporting substrate that supports a scintillator layer that converts a radiation into light is known (for example, see Patent Literature 1). A radiation flat panel detector disclosed in Patent Literature 1 includes a supporting substrate made from a polymer film, a scintillator layer made from columnar crystals, formed on the supporting substrate, a moisture-proof protective film that wraps around the substrate and the scintillator layer, and a light receiving element disposed on a portion of the scintillator layer closer to a side opposite to the supporting substrate so as to detect light generated in the scintillator layer in a light receiving surface. Moreover, a radiation detector in which a substrate made from a resin is used as a supporting substrate is known (for example, see Patent Literature 2).

Further, a radiation detector in which a plurality of light receiving elements are arranged in a tiled form in order to increase the size of a detector is known as an example of the radiation detector (for example, see Patent Literatures 3 to 6). Moreover, a radiation detector in which a protective film is filled between the columnar crystals that form a scintillator layer is known (for example, see Patent Literature 7).

CITATION LIST

Patent Literature

Patent Literature 1: WO 2008/018277 A
Patent Literature 2: JP 2004-61115 A
Patent Literature 3: JP 2000-131444 A
Patent Literature 4: JP 9-257943 A
Patent Literature 5: JP 9-260626 A
Patent Literature 6: JP 2001-74846 A
Patent Literature 7: JP 2000-09847 A

SUMMARY OF INVENTION

Technical Problem

In the radiation flat panel detector disclosed in Patent Literature 1, since a polymer film having flexible properties is used as the supporting substrate, it is possible to deform the supporting substrate and the scintillator layer so as to conform to the shape of the light receiving surface of the light receiving element. In the radiation flat panel detector, the supporting substrate and the scintillator layer are deformed to make the gap between the scintillator layer and the light receiving surface uniform and to improve the resolution associated with radiation detection.

However, in the radiation flat panel detector, if a change in the shape on the side of the light receiving surface is large, the scintillator layer having insufficient flexible properties is bent at a small angle. Thus, there is a problem in that the scintillator layer is easily detached and the crystals are broken. In particular, when a plurality of light receiving elements are arranged in a tiled form, if a step is formed between the adjacent light receiving elements, a problem may occur in that a large deformation along the step is applied to the scintillator layer to break the crystals. Such a problem results in a decrease in the reliability of the radiation detector.

Therefore, an object of the present invention is to provide a radiation detector capable of improving reliability while using a plurality of light receiving elements to provide a large screen size.

Solution to Problem

A radiation detector includes: a flexible base that includes a radiation incident surface and a radiation emission surface; a scintillator layer made from a plurality of columnar structures formed on the emission surface through crystal growth and generating light due to the incident radiation; a moisture-proof protective layer covering the scintillator layer and filled between the plurality of columnar structures; and a plurality of light receiving elements arranged to oppose the scintillator layer and detecting the light generated in the scintillator layer.

According to the radiation detector, since the plurality of light receiving elements are used, it is possible to realize a large screen size at a low cost as compared to a case of using one light receiving element. Further, according to the radiation detector, since a flexible base having flexible properties is used as a member that supports the scintillator layer, even when a step is formed between the adjacent light receiving elements, it is possible to deform the flexible base and the scintillator layer so as to follow the step. In this way, in the radiation detector, since it is possible to suppress the effect of the step and to make the gap between the light receiving element and the scintillator layer uniform, it is possible to improve the resolution of the radiation detector. Further, in the radiation detector, since the moisture-proof protective layer is filled between the columnar structures of the scintillator layer, it is possible to improve the bending deformation strength of the scintillator layer as compared to a case where the moisture-proof protective layer is not filled between the columnar structures. Thus, according to the radiation detector, by improving the bending deformation strength of the scintillator layer, it is possible to prevent the occurrence of a problem such as a breaking of a scintillator layer resulting from a deformation. Therefore, it is possible to improve the reliability of the radiation detector.

In the radiation detector, the flexible base may be made from a polymer film.

According to the radiation detector, it is possible to easily manufacture the flexible base that has appropriate strength and flexibility for supporting the scintillator layer. Moreover, it is relatively easy to change design as compared to other materials.

In the radiation detector, the flexible base may have four corners of a rectangular planar shape cut in a straight line.

According to the radiation detector, it is possible to decrease the occurrence of wrinkles on the corners due to a bending deformation as compared to a case of using a rectangular planar flexible base. As a result, in the radiation detector, since it is possible to prevent the occurrence of a problem such as a strain in the scintillator layer due to wrinkles occurring in the flexible base, it is possible to improve the reliability of the radiation detector.

Moreover, the radiation detector may further include a base disposed on a side of the plurality of light receiving elements opposite to the scintillator layer, supporting the plurality of light receiving elements.

According to the radiation detector, since it is possible to reliably support the plurality of light receiving elements by the base, it is possible to improve the durability of the radiation detector. Moreover, since this decreases the possibility that when an external impact is applied, the positional relation between the light receiving elements is shifted so that the performance of the radiation detector decreases, this contributes to improving the reliability of the radiation detector.

Advantageous Effects of Invention

According to the present invention, it is possible to improve reliability of the radiation detector while using a plurality of light receiving elements to provide a large screen size.

DESCRIPTION OF EMBODIMENTS

Figure 1:
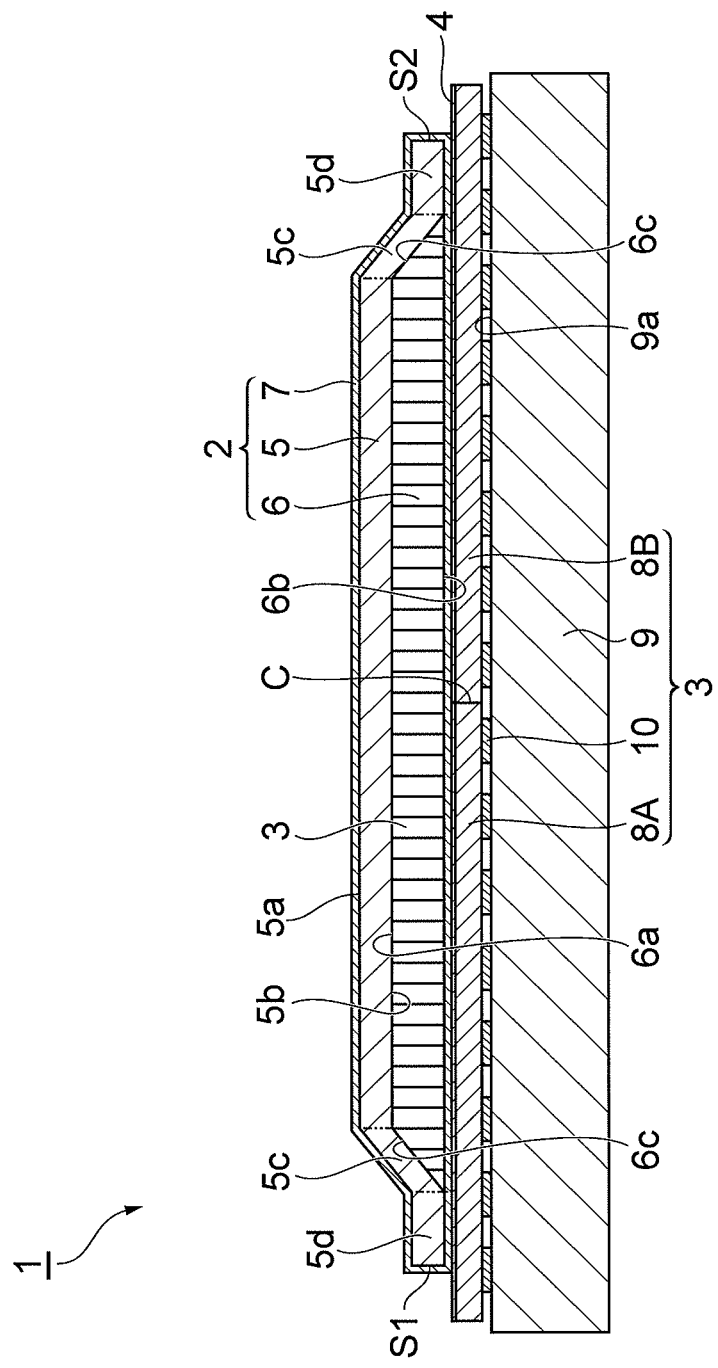
FIG. 1 is a cross-sectional view illustrating an embodiment of a radiation detector according to the present invention.

Hereinafter, a preferred embodiment of the present invention will be described in detail with reference to the drawings. In addition, in the description of the drawings, the same or corresponding portions will be denoted by the same reference numerals, and redundant description thereof will not be provided. Moreover, in the drawings, dimensions, forms, and size relations between constituent components are not always identical to those of actual components.

Figure 2:
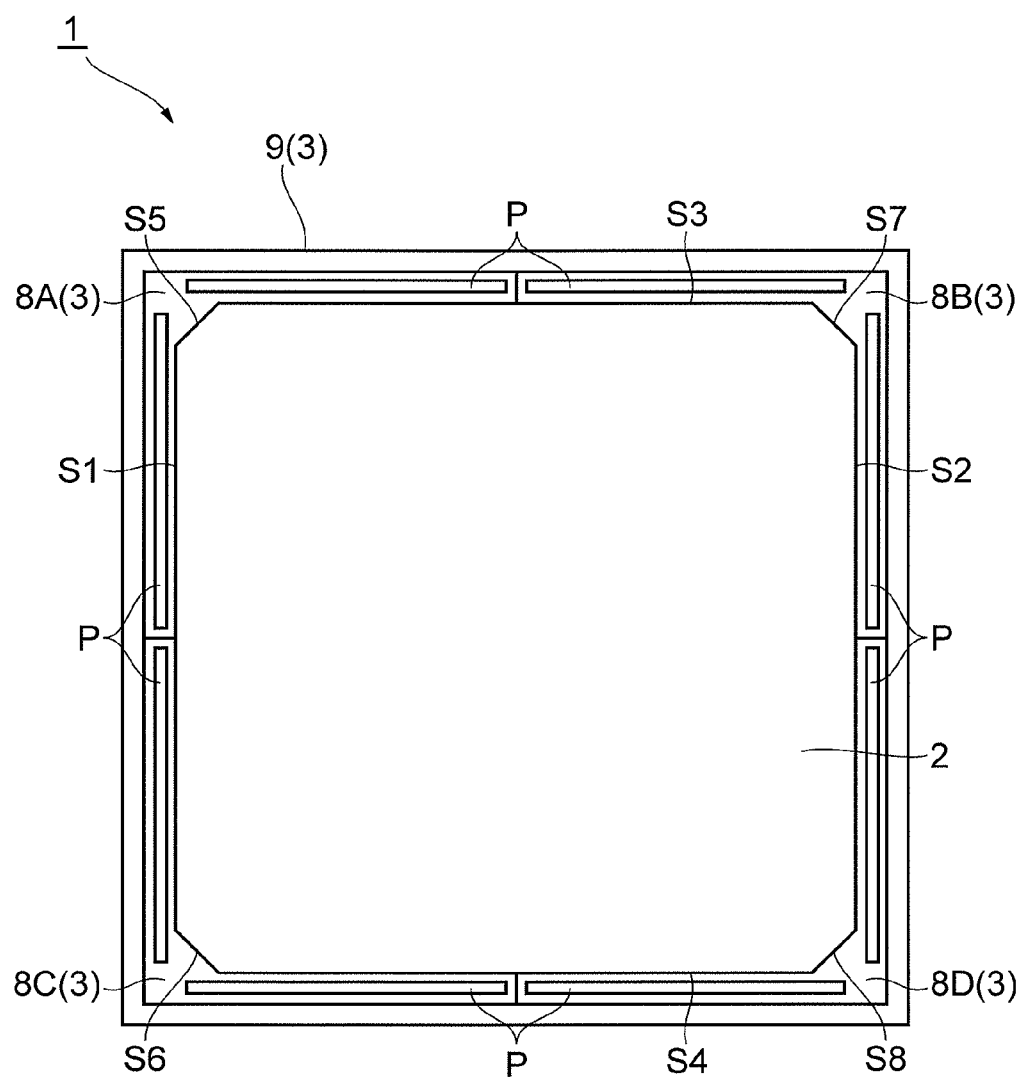
FIG. 2 is a plan view illustrating the radiation detector of FIG. 1.

As illustrated in FIGS. 1 and 2, a radiation detector 1 according to the present embodiment is configured to detect a radiation such as an X-ray and is used, for example, in a positron emission tomography (PET) apparatus or a computed tomography (CT) apparatus. The radiation detector 1 includes a scintillator panel 2, a light detection portion 3, and an adhesive layer 4.

The scintillator panel 2 is a panel that converts a radiation such as an X-ray into light. The scintillator panel 2 includes a supporting substrate 5, a scintillator layer 6, and a moisture-proof protective layer 7. The supporting substrate 5 is a substrate having flexible properties, made from a polymer film, for example. An example of a polymer that forms the supporting substrate 5 includes polyimide. Moreover, the supporting substrate 5 is a radiation transmission substrate that transmits a radiation such as an X-ray. The supporting substrate 5 includes an incident surface 5a on which a radiation is incident and an emission surface 5b from which the incident radiation is emitted.

The supporting substrate 5 is a member of which the four corners having a rectangular planar shape are cut along a straight line. The supporting substrate 5 is formed in a thin dish shape so as to cover the scintillator layer 6. That is, an outer edge portion 5c that is inclined toward the emission surface 5b and an opposing end portion 5d that is formed on an outer side of the outer edge portion 5c in a flange form are formed on an outer periphery side of the supporting substrate 5. The outer edge portion 5c extends to reach a side surface 6c of the scintillator layer 6. The opposing end portion 5d is formed so as to face the light detection portion 3 in a thickness direction of the supporting substrate 5.

Moreover, the supporting substrate 5 includes eight side surfaces S1 to S8. These side surfaces S1 to S8 are formed by cutting four rectangular planar corners along a straight line. The first side surface S1 and the second side surface S2 are surfaces that are approximately parallel to each other. Moreover, the third side surface S3 is a surface that is approximately vertical to the first side surface S1. The fourth side surface S4 is a surface that is approximately vertical to the first side surface S1 and is approximately parallel to the third side surface S3. Moreover, the fifth side surface S5 is a flat surface that connects the first side surface S1 and the third side surface S3. Similarly, the sixth side surface S6 is a flat surface that connects the first side surface S1 and the fourth side surface S4, and the seventh side surface S7 is a flat surface that connects the second side surface S2 and the third side surface S3. The eighth side surface S8 is a flat surface that connects the second side surface S2 and the fourth side surface S4.

The first to fourth side surfaces S1 to S4 have approximately the same area. Moreover, the fifth to eighth side surfaces S5 to S8 also have approximately the same area. The areas of the first to fourth side surfaces S1 to S4 are larger than the areas of the fifth to eighth side surfaces S5 to S8. The supporting substrate 5 corresponds to a flexible base described in claims.

Figure 3:
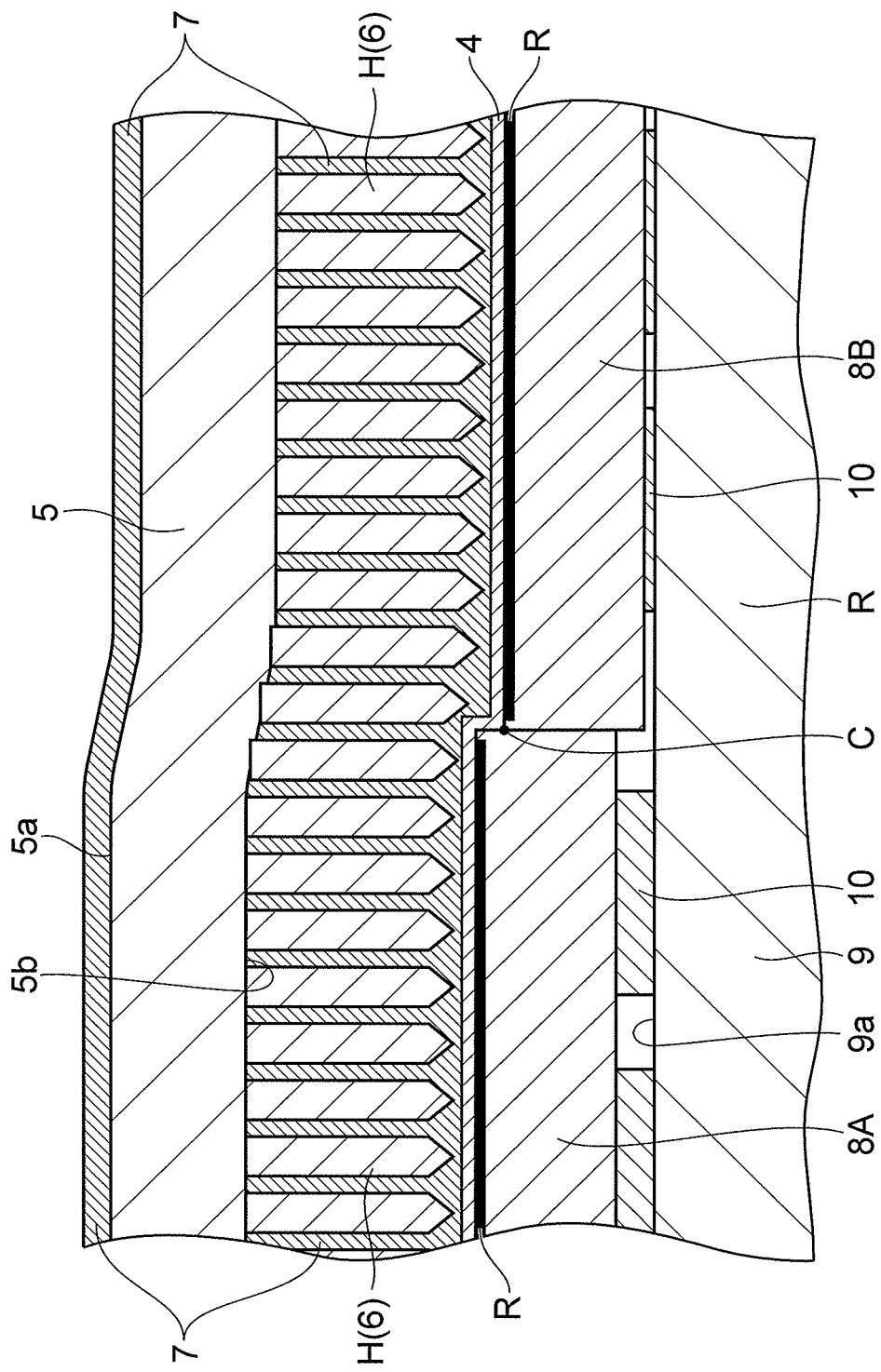
FIG. 3 is an enlarged cross-sectional view illustrating a deformed state of a scintillator panel at a step between light receiving elements.
Figure 4:
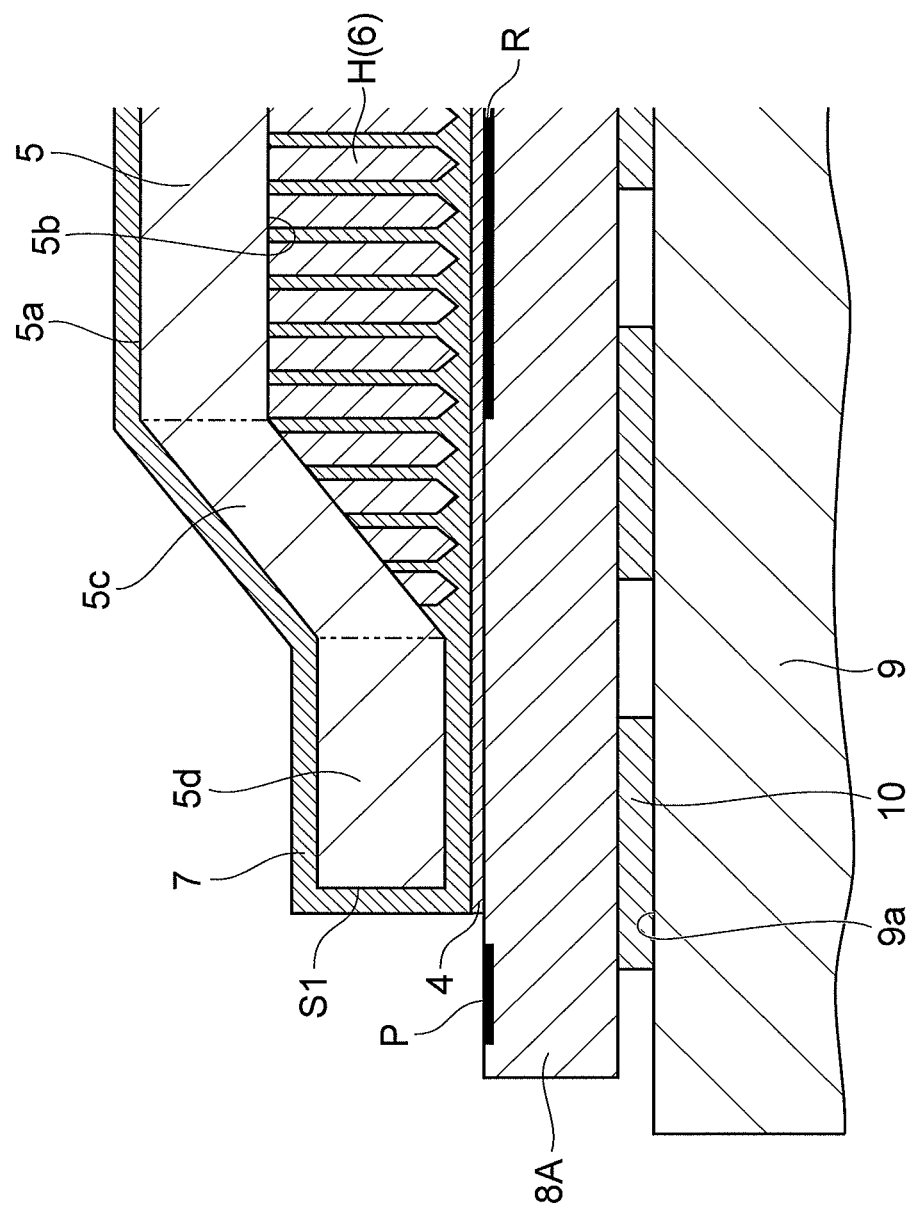
FIG. 4 is an enlarged cross-sectional view illustrating a deformed state of an outer edge portion of the scintillator panel.
Figure 5:
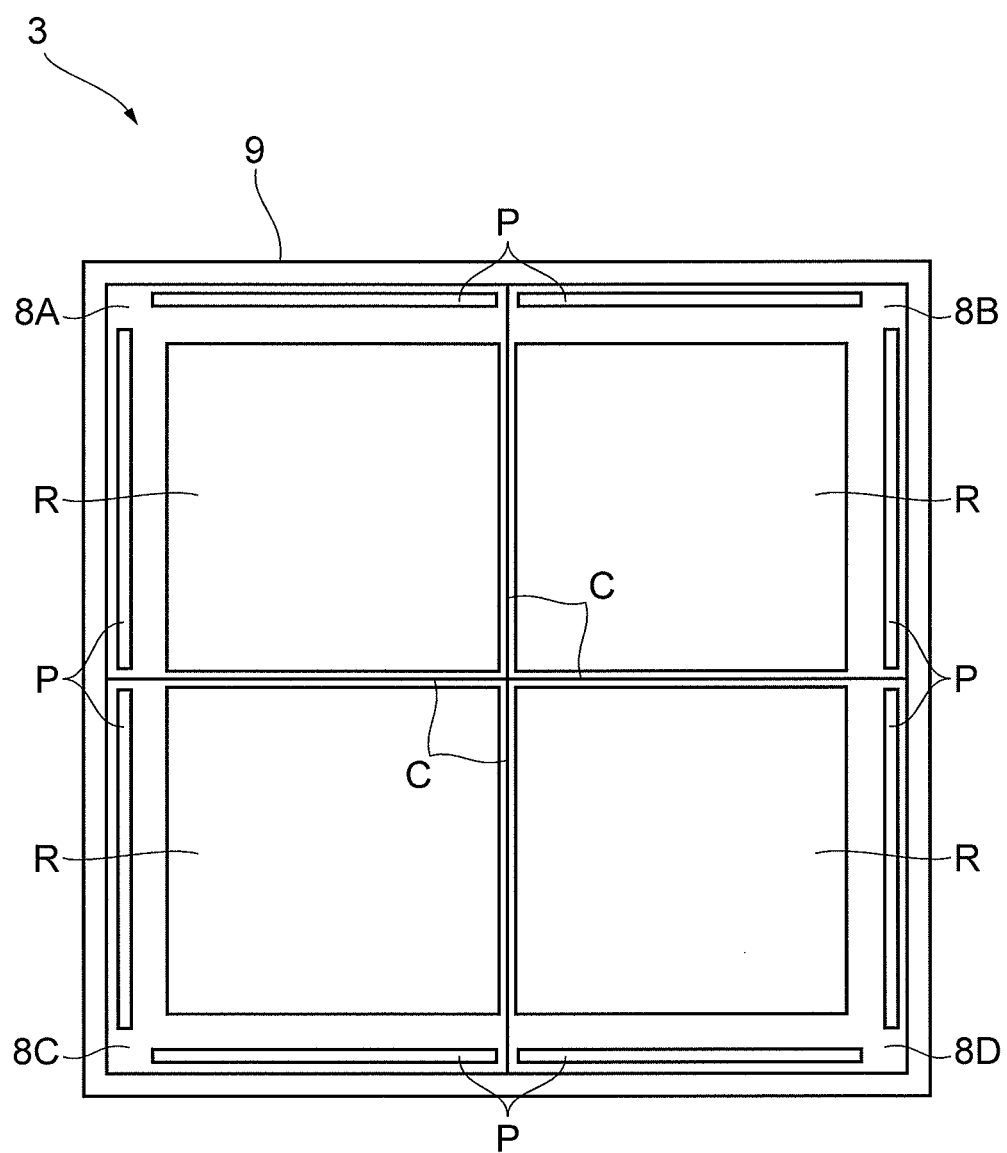
FIG. 5 is a plan view illustrating a light detection portion.

The scintillator layer 6 is made from columnar crystals H of cesium iodide (CsI) doped with thallium (Tl), for example (see FIGS. 3 and 4). The scintillator layer 6 is formed by growing a plurality of columnar crystals H on the emission surface 5b of the supporting substrate 5 by a vapor deposition method. The columnar crystals H correspond to columnar structures described in claims.

The scintillator layer 6 has an approximately quadrangular pyramid shape. The scintillator layer 6 having an approximately quadrangular pyramid shape has an incident surface 6a and an emission surface 6b that are approximately parallel to each other, and side surfaces 6c. The thickness of the scintillator layer 6 is approximately 200 µm.

The incident surface 6a is a surface on which a radiation having passed through the supporting substrate 5 is incident. The incident surface 6a is formed along the emission surface 5b of the supporting substrate 5. The emission surface 6b is a surface from which light generated within the scintillator layer 6 due to the incident radiation is emitted. The emission surface 6b is formed on a side opposite to the incident surface 6a. The emission surface 6b has a larger area than the incident surface 6a.

The side surface 6c is a surface that is inclined in relation to the incident surface 6a and the emission surface 6b (see FIG. 4). The side surface 6c is inclined toward the outer side as it advances from the incident surface 6a to the emission surface 6b. Moreover, the side surface 6c is covered with the outer edge portion 5c of the supporting substrate 5. A radiation having passed through the supporting substrate 5 is incident on the side surface 6c.

The moisture-proof protective layer 7 is a protective film for preventing moisture from entering into the scintillator layer 6. The moisture-proof protective layer 7 is made from polyparaxylylene, for example. The moisture-proof protective layer 7 covers the outer sides of the supporting substrate 5 and the scintillator layer 6. The supporting substrate 5 and the scintillator layer 6 are sealed by the moisture-proof protective layer 7. Moreover, the moisture-proof protective layer 7 is filled between the plurality of columnar crystals H that form the scintillator layer 6. In other words, the moisture-proof protective layer 7 enters between the columnar crystals H from a distal end side of the columnar crystals H and reaches the bases (that is, the emission surface 5b) of the columnar crystals H. The moisture-proof protective layer 7 wraps around the respective columnar crystals H. The supporting substrate 5 and the scintillator layer 6 have flexible properties in a state of being sealed by the moisture-proof protective layer 7. That is, the scintillator panel 2 has flexible properties.

As illustrated in FIGS. 1 and 3 to 5, the light detection portion 3 is an image sensor that detects light emitted from the emission surface 6b of the scintillator layer 6. The light detection portion 3 includes four light receiving elements 8A to 8D, a mount substrate 9, and an adhesion portion 10.

The light receiving elements 8A to 8D are photoelectric conversion elements made from a photodiode or the like. The light receiving elements 8A and 8D have a rectangular planar shape. The light receiving elements 8A to 8D convert light incident on a light receiving surface R into electrical energy. The light receiving elements 8A to 8D include a bonding pad portion P for electrically connecting to an external apparatus. The bonding pad portion P includes a plurality of bonding pads. The light receiving elements 8A to 8D output the electrical energy generated by photoelectric conversion to the outside through the bonding pad portion P.

The mount substrate 9 is a planar member made from an insulating material such as glass. The mount substrate 9 is disposed on a side of the light receiving elements 8A to 8D opposite to the scintillator panel 2. The mount substrate 9 has a supporting surface 9a which is a flat surface that supports the light receiving elements 8A to 8D. The mount substrate 9 supports the light receiving elements 8A to 8D so as to face the scintillator layer 6. The mount substrate 9 corresponds to a base described in claims.

The light receiving elements 8A to 8D are tiled on the supporting surface 9a of the mount substrate 9. That is, the light receiving elements 8A to 8D are arranged in a tiled form on the supporting surface 9a. The light receiving element 8A to 8D are disposed to form a large light receiving surface with a joint portion C interposed between the respective light receiving surfaces R. The light receiving elements 8A to 8D are disposed so that two sides of each light receiving element are adjacent to the other light receiving elements. The light receiving elements 8A to 8D are disposed on the supporting surface 9a so that the light receiving surface R faces the emission surface 6b of the scintillator layer 6. When the light receiving elements 8A to 8D are tiled in this manner, a step having a thickness of approximately several tens of μm may be formed in the joint portion C of the light receiving elements 8A to 8D (see FIG. 3).

The supporting surface 9a of the mount substrate 9 and the light receiving elements 8A to 8D are attached and fixed by the adhesion portions 10. A plurality of the adhesion portions 10 are made from an adhesive resin and are provided on the supporting surface 9a at predetermined intervals.

The adhesive layer 4 is a layer that attaches the scintillator panel 2 and the light detection portion 3. The adhesive layer 4 is made from an adhesive resin having low moisture permeability, for example. The adhesive layer 4 is attached to the emission surface 6b of the scintillator layer 6 with the moisture-proof protective layer 7 interposed. Moreover, the adhesive layer 4 is attached to the opposing end portion 5d of the supporting substrate 5 with the moisture-proof protective layer 7 interposed (see FIG. 4). The adhesive layer 4 is attached to the supporting substrate 5 and the scintillator layer 6 with the moisture-proof protective layer 7 interposed and is also attached to the light receiving elements 8A to 8D of the light detection portion 3. In this way, the adhesive layer 4 attaches and fixes the scintillator panel 2 to the light detection portion 3.

Next, a method for manufacturing the radiation detector 1 according to the present embodiment will be described with reference to FIGS. 6 to 10.

Figure 6:
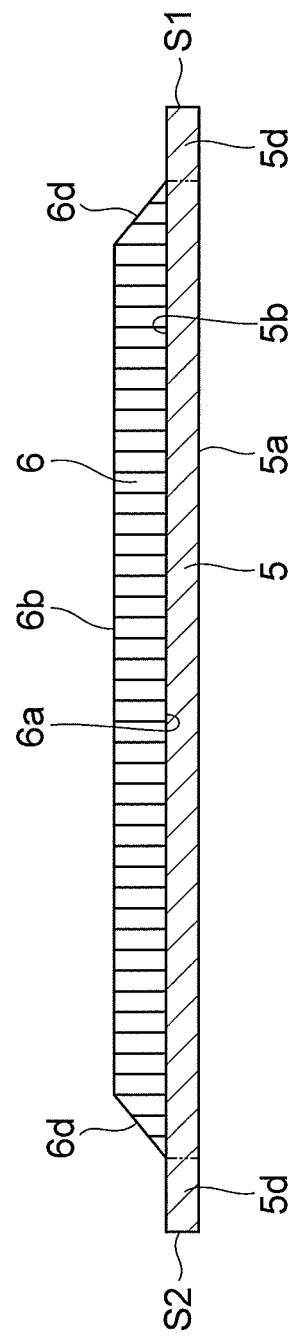
FIG. 6 is a cross-sectional view illustrating a scintillator layer forming step.
Figure 7:
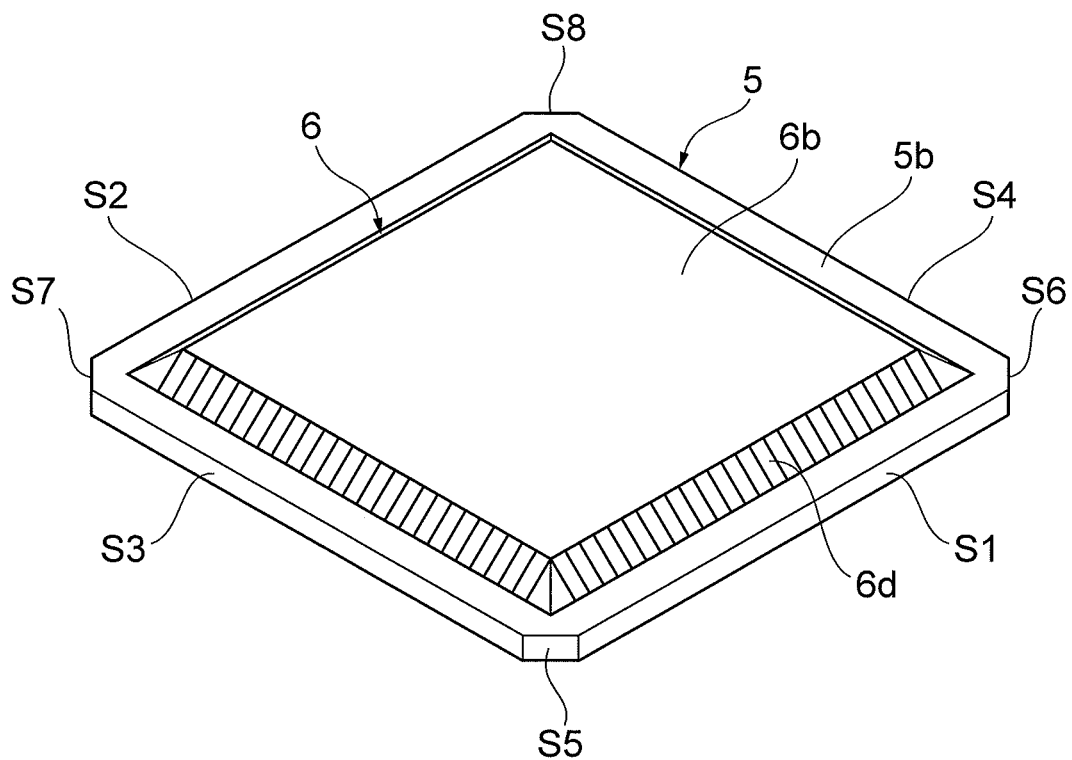
FIG. 7 is a perspective view illustrating a scintillator layer forming step.
Figure 8:
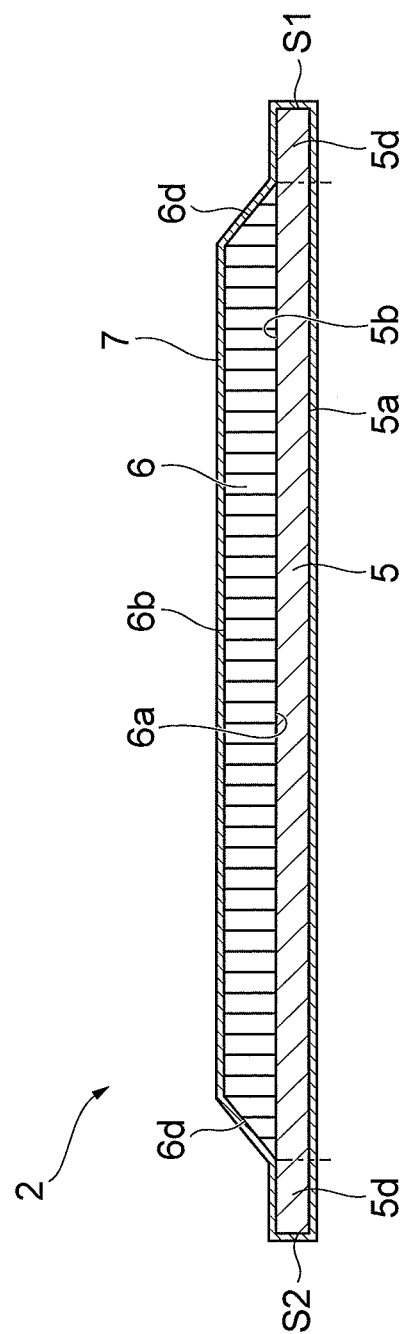
FIG. 8 is a cross-sectional view illustrating a protective film forming step.
Figure 9:
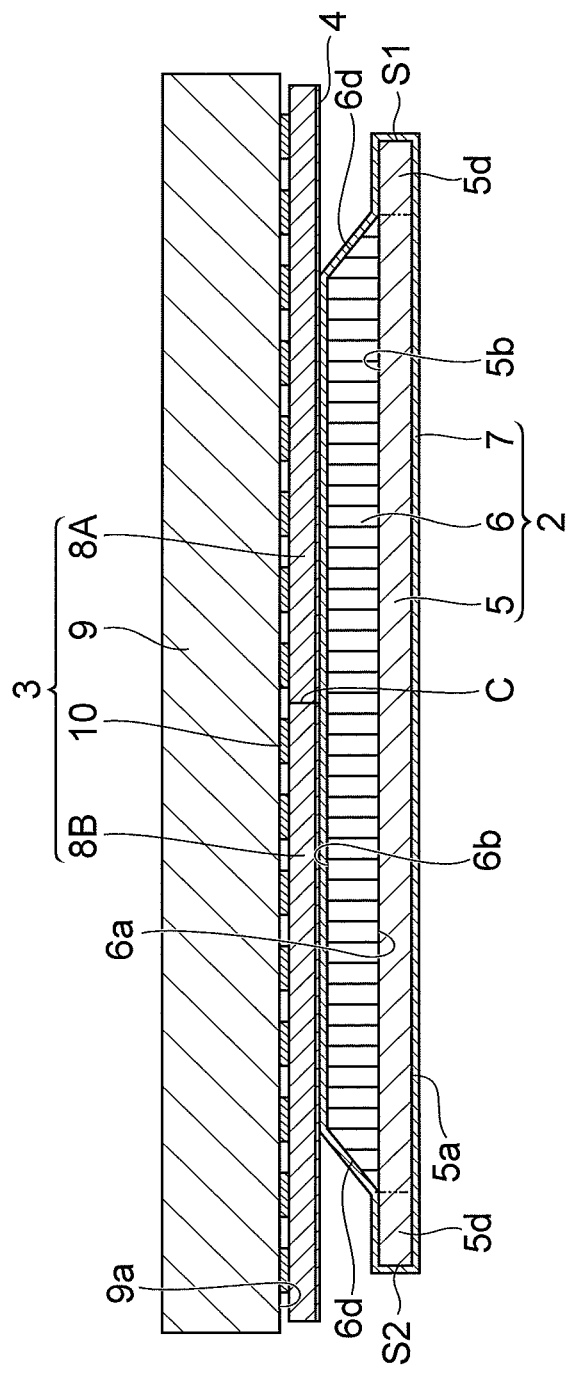
FIG. 9 is a cross-sectional view illustrating an attachment step.
Figure 10:
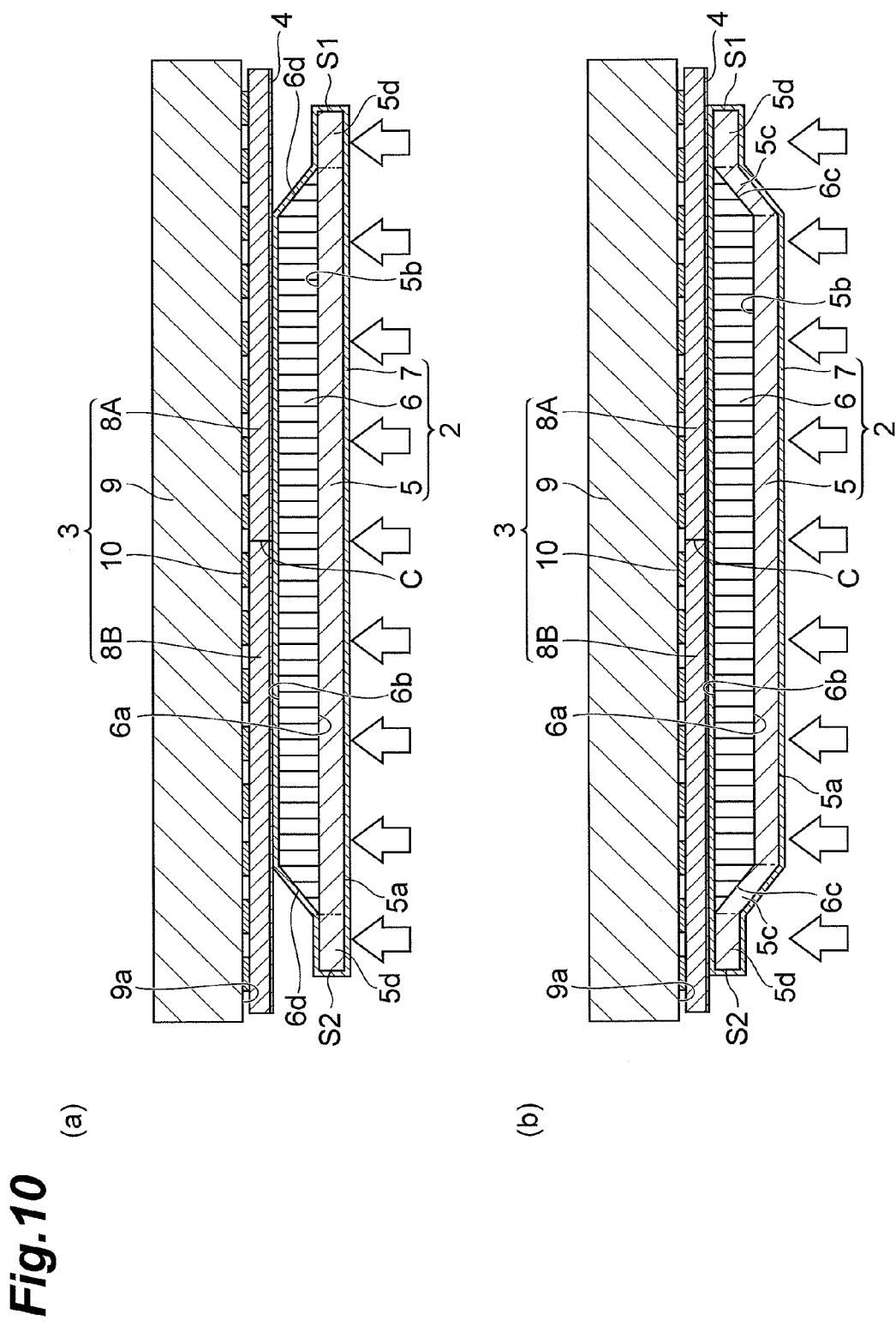
FIG. 10 is a cross-sectional view illustrating a deformation step.

FIG. 6 is a diagram illustrating a scintillator forming step of forming the scintillator layer 6 on the supporting substrate 5. FIG. 7 is a diagram illustrating a cutting step of cutting the four corners of the rectangular planar supporting substrate 5. FIG. 8 is a diagram illustrating a protective film forming step of forming the moisture-proof protective layer 7. FIG. 9 is a diagram illustrating an attachment step of attaching the supporting substrate 5 and the scintillator layer 6 to the light detection portion 3. FIGS. 10(a) and 10(b) are diagrams illustrating a deformation step of deforming the supporting substrate 5 and the scintillator layer 6. Specifically, FIG. 10(a) illustrates the scintillator panel 2 when the deformation step starts. FIG. 10(b) illustrates the scintillator panel 2 when the deformation step ends.

First, in the scintillator forming step illustrated in FIG. 6, the scintillator layer 6 is formed on the emission surface 5b of the supporting substrate 5. In the scintillator forming step, the supporting substrate 5 made from a polymer film is fixed to a reinforcing plate having a sufficient rigidity. In this state, the supporting substrate 5 has a rectangular planar shape. After that, Tl-doped CsI is vapor-deposited on the emission surface 5b in a state where the supporting substrate 5 and the reinforcing plate are rotated, whereby the scintillator layer 6 is formed.

The scintillator layer 6 formed in the scintillator layer forming step has an approximately quadrangular pyramid shape such that the scintillator layer 6 broadens as it advances from the emission surface 6b to the incident surface 6a. The scintillator layer 6 in this stage has such a structure that the area of the incident surface 6a is larger than the area of the emission surface 6b, and an inclined state of the side surface 6d is different from that of the side surface 6c of FIG. 1. The side surface 6d protrudes outward as it advances from the emission surface 6b to the incident surface 6a.

After that, in the cutting step illustrated in FIG. 7, the four corners of the rectangular planar supporting substrate 5 are cut. By this cutting step, the supporting substrate 5 has a shape such that the four rectangular planar corners are cut along a straight line, and eight side surfaces S1 to S8 are formed in the supporting substrate 5. The expression that the four rectangular planar corners of the supporting substrate 5 are cut along a straight line does not restrict the supporting substrate to one of which the shape before forming has a rectangular planar shape. The expression also includes a supporting substrate in which the four corners having a rectangular planar shape after forming are cut along a straight line regardless of the shape before forming.

Subsequently, in a protective film forming step illustrated in FIG. 8, the moisture-proof protective layer 7 is formed. In the protective film forming step, the supporting substrate 5 on which the scintillator layer 6 is formed is input into a vapor deposition chamber of a chemical vapor deposition (CVD) apparatus. Moreover, by a CVD method of exposing the supporting substrate 5 to vapor that is obtained by sublimating the raw material of polyparaxylylene, the moisture-proof protective layer 7 is formed so as to cover the outer sides of the supporting substrate 5 and the scintillator layer 6. The supporting substrate 5 and the scintillator layer 6 have sufficient flexible properties in a state of being covered by the moisture-proof protective layer 7. By the protective film forming step, the scintillator panel 2 having flexible properties is formed.

Subsequently, in the attachment step illustrated in FIG. 9, the scintillator panel 2 is attached to the light detection portion 3. In the attachment step, first, the adhesive layer 4 is formed on the surfaces of the light receiving elements 8A to 8D of the light detection portion 3. After the adhesive layer 4 is formed, the scintillator panel 2 is attached to the light detection portion 3 so that the emission surface 6b of the scintillator layer 6 faces the light receiving surfaces R of the light receiving elements 8A to 8D.

After that, in the deformation step illustrated in FIGS. 10(a) and 10(b), the scintillator panel 2 is deformed so as to extend along the surfaces of the light receiving elements 8A to 8D. In this deformation step, the supporting substrate 5 and the scintillator layer 6 having flexible properties are deformed by pressing the same toward the light detection portion 3. Due to the pressing, the supporting substrate 5 and the scintillator layer 6 are deformed from the state illustrated in FIG. 10(a) to the state illustrated in FIG. 10(b). The scintillator layer 6 is deformed so as to be closely attached to the light receiving elements 8A to 8D.

Specifically, in the scintillator layer 6, the side surface 6d is pressed against the light receiving surfaces R of the light receiving elements 8A to 8D and is deformed to be the same surface as the emission surface 6b. At the same time, a portion of the incident surface 6a of the scintillator layer 6 is deformed to form the side surfaces 6c. On the other hand, with the deformation of the scintillator layer 6, the supporting substrate 5 is deformed from the flat plate shape illustrated in FIG. 10(a) into an approximately shallow dish shape illustrated in FIG. 10(b). Due to this deformation, the outer edge portion 5c and the opposing end portion 5d are formed on the outer periphery side of the supporting substrate 5.

After the respective steps described above are executed, the adhesive layer 4 is cured, and a predetermined finishing treatment is performed. In this way, the radiation detector 1 illustrated in FIG. 1 is obtained.

Next, operations and effects of the radiation detector 1 according to the present embodiment will be described.

According to the radiation detector 1 of the present embodiment, since the plurality of light receiving elements 8A to 8D is used, it is possible to easily realize a large screen size at a low cost as compared to a case of using one light receiving element. Further, according to the radiation detector 1, since the supporting substrate 5 that supports the scintillator layer 6 has flexible properties, even when a step is formed between the adjacent light receiving elements 8A to 8D, it is possible to deform the supporting substrate 5 and the scintillator layer 6 so as to follow the step. In this way, since it is possible to suppress the effect of the step and to make the gap between the light receiving elements 8A to 8D and the scintillator layer 6 uniform, it is possible to improve the resolution of the radiation detector 1.

Further, in the radiation detector 1, since the moisture-proof protective layer 7 is filled between the columnar crystals H of the scintillator layer 6, it is possible to improve the bending deformation strength of the scintillator layer 6 as compared to a case where the moisture-proof protective layer 7 is not filled between the columnar crystals H. That is, even when the scintillator layer 6 is bent, since the moisture-proof protective layer 7 is filled between the columnar crystals H, it is possible to prevent the columnar crystals H from coming into contact with each other and being broken. Thus, according to the radiation detector 1, by improving the bending deformation strength of the scintillator layer 6, it is possible to prevent the occurrence of a problem such as a breaking of the scintillator layer 6 resulting from a deformation. Therefore, it is possible to improve the reliability of the radiation detector 1.

Moreover, according to the radiation detector 1, since the polymer film is used as the supporting substrate 5, it is possible to easily manufacture the supporting substrate 5 that has appropriate strength and flexibility for supporting the scintillator layer 6. Moreover, it is relatively easy to change design as compared to other materials.

Further, in the radiation detector 1, since the supporting substrate 5 in which four rectangular planar corners are cut along a straight line is used, it is possible to decrease the occurrence of wrinkles on the corners due to a bending deformation as compared to a case of using a rectangular planar supporting substrate. As a result, since it is possible to prevent the occurrence of a problem such as a strain in the scintillator layer 6 due to the wrinkles occurring in the supporting substrate 5, it is possible to improve the reliability of the radiation detector 1. Moreover, it is possible to easily form the shape just by cutting the four corners of the rectangular planar supporting substrate 5.

Moreover, since the radiation detector 1 includes the mount substrate 9, it is possible to reliably support the light receiving elements 8A and 8D. Thus, it is possible to improve the durability of the radiation detector 1. Moreover, since this decreases the possibility that when an external impact is applied, the positional relationship between the light receiving elements 8A to 8D is shifted so that the performance of the radiation detector 1 decreases, this contributes to improving the reliability of the radiation detector 1.

The present invention is not limited to the above-described embodiment.

For example, the scintillator panel 2 may have a critical edge in which the end portions of the supporting substrate 5 and the scintillator layer 6 are identical. The critical edge can be formed by cutting the opposing end portion 5d of the supporting substrate 5. In this way, by forming the critical edge by cutting or the like, it is possible to increase the degree of freedom of selecting the size of the scintillator panel 2. Moreover, since the adjustment of size is made easy, it is possible to improve the mass production properties of the products having the same size. A plurality of critical edges may be formed, and all sides may be formed as critical edges.

Moreover, the supporting substrate 5 may be made from a material other than the polymer film. Moreover, the mount substrate 9 does not always have to be provided, and for example, the light receiving elements may be supported by a simple connecting member or the like. Further, the number of light receiving elements is not limited to four and may be two or more. Moreover, an arrangement of the light receiving elements is not limited to that described in the present embodiment.

Moreover, the configuration of the scintillator panel 2 is not limited to that of the present embodiment. For example, the scintillator panel 2 may include a plurality of moisture-proof protective films and may include a light reflecting film that reflects light toward the supporting substrate 5 and a light absorbing layer that absorbs light.

INDUSTRIAL APPLICABILITY

The present invention can be used in a radiation detector.

REFERENCE SIGNS LIST

1 ... radiation detector; 2 ... scintillator panel; 3 ... light detection portion; 4 ... adhesive layer; 5 ... supporting substrate (flexible base); 5a ... incident surface; 5b ... emission surface; 5c ... outer edge portion; 5d ... opposing end portion; 6 ... scintillator layer; 6a ... incident surface; 6b ... emission surface; 6c ... side surface; 6d ... side surface; 7 ... moisture-proof protective layer; 8A to 8D ... light receiving element; 9 ... mount substrate (base); 9a ... supporting surface; 10 ... adhesion portion; H ... columnar crystal (columnar structure); S1 to S8 ... side surface

The invention claimed is:

1. A radiation detector comprising:
   a flexible base that includes a radiation incident surface and a radiation emission surface;
   a scintillator layer made from a plurality of columnar structures formed on the emission surface through crystal growth and generating light due to the incident radiation;
   a moisture-proof protective layer covering the scintillator layer and filled between the plurality of columnar structures so as to reach the radiation incident surface; and
   a plurality of light receiving elements arranged to oppose the scintillator layer and detecting the light generated in the scintillator layer,
   wherein the scintillator layer is adjacent to the plurality of light receiving elements by deforming at an extending direction of the plurality of columnar structures so as to follow the plurality of light receiving elements.

2. The radiation detector according to claim 1, wherein the flexible base is made from a polymer film.

3. The radiation detector according to claim 1, wherein the flexible base has four corners of a rectangular planar shape cut in a straight line.

4. The radiation detector according to claim 1, further comprising a base disposed on a side of the plurality of light receiving elements opposite to the scintillator layer, supporting the plurality of light receiving elements.

5. The radiation detector according to claim 2, wherein the flexible base has four corners of a rectangular planar shape cut in a straight line.

6. The radiation detector according to claim 2, further comprising a base disposed on a side of the plurality of light receiving elements opposite to the scintillator layer, supporting the plurality of light receiving elements.

7. The radiation detector according to claim 3, further comprising a base disposed on a side of the plurality of light receiving elements opposite to the scintillator layer, supporting the plurality of light receiving elements.

* * * * *